United States Patent [19]

Tanigaki et al.

[11] Patent Number: 5,310,324
[45] Date of Patent: May 10, 1994

[54] SCROLL-TYPE FLUID MACHINE WITH ATTACHING MEANS FOR THE BALANCE WEIGHT

[75] Inventors: Ryuhei Tanigaki; Takayuki Iio, both of Aichi, Japan

[73] Assignee: Mitsubishi Jukogyo Kabushiki Kaisha, Tokyo, Japan

[21] Appl. No.: 20,587

[22] Filed: Feb. 22, 1993

[30] Foreign Application Priority Data

Feb. 27, 1992 [JP] Japan .................................. 4-075689

[51] Int. Cl.⁵ .................... F01C 1/04; F01C 21/00; F16B 2/14; F16B 21/20
[52] U.S. Cl. .................................. 418/55.1; 418/151; 403/368; 403/409.1; 464/180
[58] Field of Search ............... 418/55.1, 151; 403/368, 403/409.1; 464/180

[56] References Cited

U.S. PATENT DOCUMENTS 3,986,799 10/1976 McCullough ........................... 418/56
4,934,910 6/1990 Utter ..................................... 418/151

FOREIGN PATENT DOCUMENTS 0489479 10/1991 European Pat. Off. .
61-261688 11/1986 Japan .
62-298679 12/1987 Japan .................................. 418/55.1

*Primary Examiner*—John J. Vrablik

[57] ABSTRACT

A pin passing through a pin hole disposed in a support portion disposed on a rotating shaft is fixed to the support portion by fitting a first push nut to the pin so that the first push nut abuts against the top surface of the support portion. Then, a balance weight is supported by the support portion by fitting a second push nut onto the protruding end of the pin.

4 Claims, 3 Drawing Sheets

FIG. I
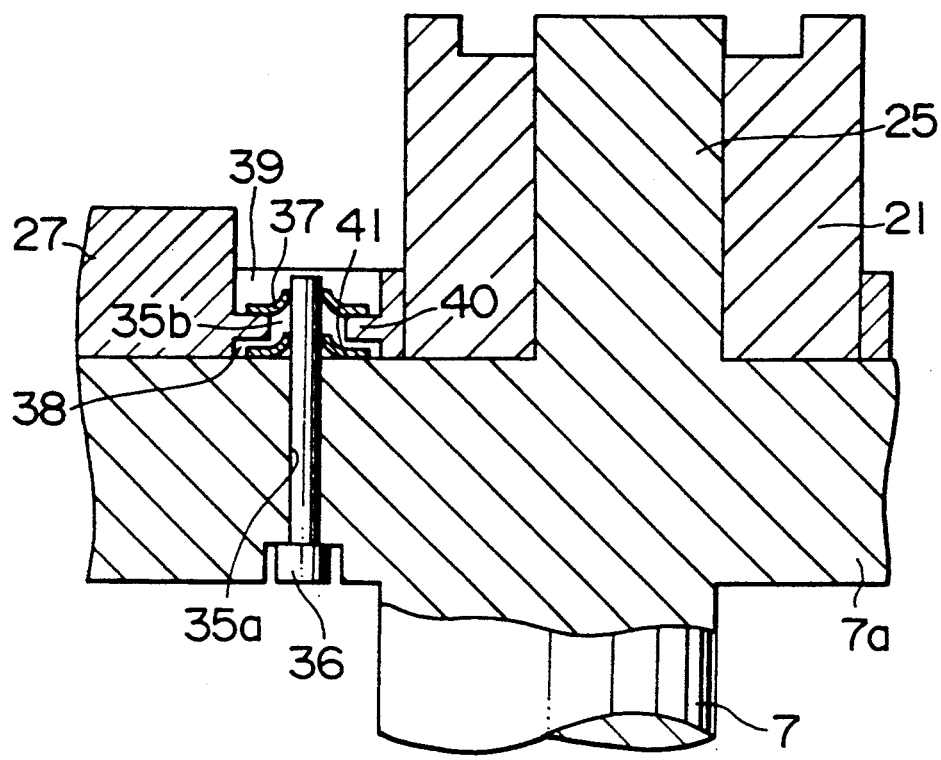
FIG. 2(A)
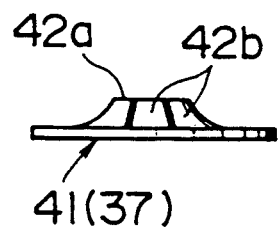
FIG. 2(B)
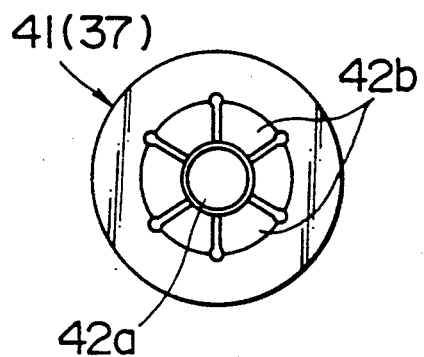

SCROLL-TYPE FLUID MACHINE WITH ATTACHING MEANS FOR THE BALANCE WEIGHT

FIELD OF THE INVENTION AND RELATED ART STATEMENT

This invention relates to an improvement of a scroll-type fluid machine used for a compressor, an expander or the like and, more particularly, a balance weight mounting construction thereof.

A scroll-type compressor of related art is shown in FIGS. 3 through 5.

Referring to FIG. 3, reference numeral 1 denotes a housing. The housing 1 comprises a cup-shaped body 2, a front end plate 4 fastened to the cup-shaped body 2 with bolts 3, and a cylindrical member 6 fastened to the front end plate 4 with bolts 5. A rotating shaft 7 passing through the cylindrical member 6 is rotatably supported by the housing 1 via bearings 8 and 9.

The housing 1 incorporates a fixed scroll 10 and a rotary scroll 14.

The fixed scroll 10 has an end plate 11 and a spiral wrap 12 disposed on the inner surface of the end plate 11. The fixed scroll 10 is fixed to the housing 1 by fastening its end plate 11 to the cup-shaped body 2. A discharge cavity 31 is formed on the outside of the end plate 11, and a suction chamber 28 is defined on the inside of the end plate 11. A discharge port 29, which is opened/closed by the discharge valve 30, is disposed at the center of the end plate 11.

The rotary scroll 14 has an end plate 15 and a spiral wrap 16 disposed on the inner surface of the end plate 15. The shape of the spiral wrap 16 is substantially the same as that of the spiral wrap 12 of the fixed scroll 10.

The rotary scroll 14 and the fixed scroll 10 each have a radius of revolution that is mutually off-center and engaged with each other at a shifted angle of 180° as shown in the figure. A tip seal 17 embedded in the tip end of the spiral wrap 12 is in contact with the inner surface of the end plate 15, while a tip seal 18 embedded in the tip end of the spiral wrap 16 is in contact with the inner surface of the end plate 11. The side surfaces of the spiral wraps 12 and 16 are in linear contact with each other at a plurality of places, and a plurality of compression chambers 19a and 19b which are symmetric with respect to the center of spiral are formed.

A cylindrical boss 20 protrudes at the center of the outer surface of the end plate 15 of the rotary scroll 14. In the boss 20, a drive bushing 21 is rotatably fitted via a bearing 23. A slide hole 24 is made in the drive bushing 21. A drive pin 25 protrudes on the end face of the support portion 7a disposed on the rotating shaft 7 in such a manner as to be off-centered by the radius of rotation r from the axis $O_1$ of the rotating shaft 7. The drive pin 25 is fitted to the slide hole 24 so as to slide along the longitudinal direction of the pin 25.

This scroll-type compressor is provided with a balance weight 27 to correct the dynamic imbalance due to the revolving motion of the rotary scroll 14. The balance weight 27 is supported by the support portion 7a of the rotating shaft 7 together with the drive bushing 21.

The drive bushing 21 and the balance weight 27 are prevented from tilting in the direction of the arrow A shown in FIG. 4 by a pin 36 which is inserted in the pin holes 35a and 35b that are drilled in the support portion 7a of the rotating shaft 7 and the balance weight 27, respectively, and a push nut 37, which is fitted to the tip of the pin 36, is made to abut against the end face of the balance weight.

When the rotating shaft 7 is turned, the rotary force is transmitted to the rotary scroll 14 via the drive pin 25, the drive bushing 21, the bearing 27, and the boss 20. The rotary scroll 14 revolves on a circular trajectory with a radius of eccentricity r and with the center of revolution being the axis $O_1$ of the rotating shaft 7 while its rotation is inhibited by the rotation inhibiting mechanism 26.

Thus, a gas taken into the compression chambers 19a and 19b is gradually compressed as the compression chambers 19a and 19b move toward the center of the spiral while their volumes decrease, reaching the central chamber 22, and is discharged through the discharge port 29.

In the conventional scroll-type compressor described above, the assembly is made by the following procedure: the pin 36 is pressed into the pin hole 35a of the support portion 7a in advance. The drive pin 25 is fitted to the slide hole 24 while the pin 36 is inserted into the pin hole 35b of the balance weight 27. Then, the push nut 37 is fitted to the tip of the pin 36.

This assembling operation has a problem in that the pin 36 comes out of the pin hole 35a when the push nut 37 is fitted to the pin 36 because the pin 36 is pressed into the pin hole 35a merely to a degree such that the pin 36 does not drop.

OBJECT AND SUMMARY OF THE INVENTION

An object of the present invention is to provide a scroll-type fluid machine with balanced weight that is easy to assemble.

To achieve the above object, the present invention was made. The present invention provides a scroll-type fluid machine comprising a drive bushing rotatably fitted to a rotary scroll engaging with a fixed scroll, a drive pin which protrudes from a support portion disposed on a rotating shaft and is slidably fitted into a slide hole disposed in the drive bushing, and a balance weight supported by the support portion, in which the pin passing through the pin hole disposed in the support portion is fixed to the support portion by fitting a first push nut to the pin so that the first push nut abuts against the support portion, the tip of the pin is passed through a pin hole disposed in the balance weight and protruded therefrom, and a second push nut is fitted to the protruding end of the pin so that the second push nut abuts against the balance weight, whereby the tilting of the balance weight is prevented.

Since the present invention has the above-described construction, the pin passing through the pin hole in the support portion can be fixed by fitting the first push nut to the pin so that the first push pin abuts against the support portion. Therefore, the pin is prevented from coming out of the pin hole when the second push nut is fitted to the pin. Also, tilting of the balance weight is prevented by protruding the tip of the pin passing through the pin hole and by fitting the second push nut onto the protruding end of the pin so that the second push nut abuts against the balance weight.

According to the present invention, since the pin passing through the pin hole in the support portion of the rotating shaft is fixed to the support portion by fitting the first push nut to the pin so that the first push nut abuts against the support portion, the pin is prevented from coming out of the pin hole when the second push nut is fitted to the pin in the process of assembling process of the compressor. As a result, the process for assembling the compressor is eased and the reliability thereof is enhanced.

BRIEF DESCRIPTION OF THE DRAWINGS

FIG. 1 is a longitudinal sectional view of the main portion of a compressor in accordance with one embodiment of the present invention, FIG. 2(A) is a front view of one example of a push nut of the embodiment shown in FIG. 1, and FIG. 2(B) is a top view of the same example.

DETAILED DESCRIPTION OF A PREFERRED EMBODIMENT

Figure 3:
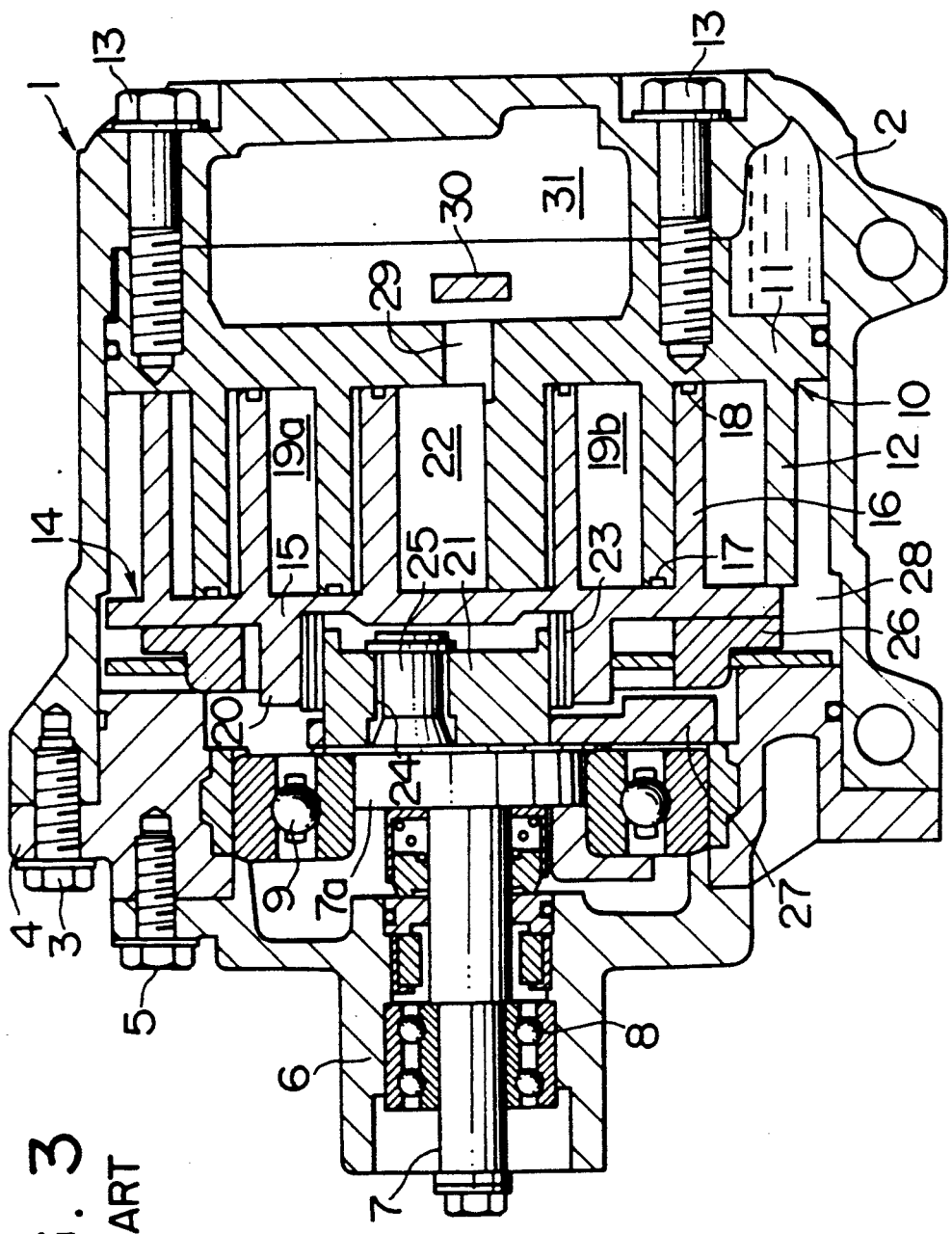
FIG. 3 is a longitudinal sectional view of a scroll-type compressor of related art.
Figure 4:
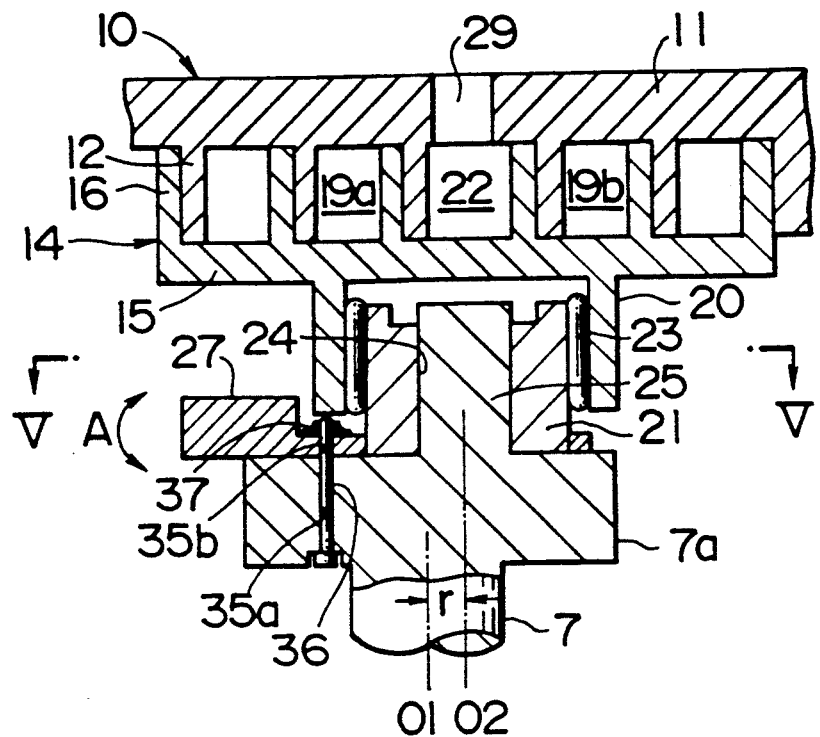
FIG. 4 is a partial longitudinal sectional view of a conventional scroll-type compressor.
Figure 5:
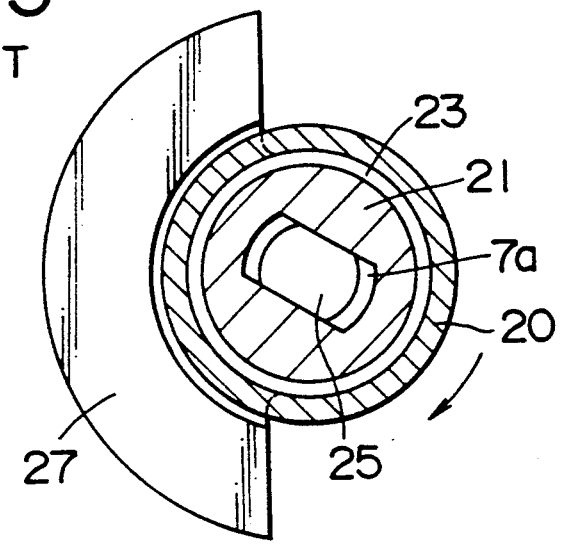
FIG. 5 is a transverse sectional view taken along the line V—V of FIG. 4.

One embodiment of the present invention is shown in FIGS. 1, 2(A) and 2(B).

On one end face of the balance weight 27, a recess 38 which is concentric with the pin hole 35b is disposed, and on the other end face thereof, a recess 39 which is concentric with the pin hole 35b is disposed. Between the recess 38 and the recess 39 is formed a seat 40.

The pin 36 is fixed to the support portion 7a by inserting the pin 36 into the pin hole 35a disposed in the support portion 7a from one side of the support portion 7a and fitting a first push nut 41 to the pin 36 so that the first push nut abuts against the other end of the support portion 7a. Then, the pin 36 is inserted into the pin hole 35b in the balance weight 27, and the balance weight 27 is mounted on the support portion 7a. Thus, the first push nut 41 is housed in the recess 38. Next, a second push nut 37 is fitted to the protruding end of the pin 36, and brought into contact with the seat 40 of the balance weight 27, by which the balance weight 27 is locked onto the support portion 7a.

The first and second push nuts 41 and 37 are formed by a thin spring plate whose central portion is raised as shown in FIGS. 2(A) and 2(B). At the central portion, a hole 42a with a diameter slightly smaller than the diameter of the pin 36 is made. By making a large number of cuts radially around the hole 42a, a large number of pieces 42b are formed. The first and second push nuts 41 and 37 engage with the pin 36 by the elastic force of the pieces 42b, and the pieces 42b serve as a stopper.

The remaining portions of the apparatus are the same as that of a conventional machine, and like characters designate like or corresponding parts.

Accordingly, the pin 36 can be fixed to the support portion 7a by fitting the first push nut 41 to the pin 36 so that the push nut 41 abuts against the other end face of the support portion 7a, and the tilting of the drive bushing 21 and the balance weight 27 can be prevented by fitting the second push nut 37 to the protruding end of the pin 36 so that the push nut 37 abuts against the seat 40 of the balance weight 27.

Since the pin 36 is fixed to the support portion 7a by the first push nut 41 as described above, the pin 36 is prevented from coming out of the pin hole 35a when the second push nut 37 is fitted to the protruding end of the pin 36 in the assembling process of the compressor.

We claim:

1. A scroll-type fluid machine, comprising:
   a drive bushing rotatably fitted to a rotary scroll for engaging a fixed scroll;
   a rotating shaft having a portion at one end for supporting the drive bushing, and a drive pin extending from said support portion that slidably engages a slide hole in said drive bushing, said support portion having first and second faces;
   a balance weight supported by and attached to said support portion, said balance weight being attached to the second face of said support portion by a pin having a flanged end that abuts the first face of said support portion and a tip end extending through a first hole in said support portion and a second hole in said balance weight;
   a first attachment means, disposed on said pin and against said second surface between said supporting portion and said balance weight, for securing the pin within said first hole such that a portion of the pin extends beyond the second surface; and
   a second attachment means disposed at the tip end of said pin and abutting said balance weight for securing said balance weight against said support portion thereby preventing tilting of the balance weight.

2. The scroll-type fluid machine as recited in claim 1, wherein said balance weight further comprises a seat portion along said second hole for receiving said pin and supporting said second attachment means.

3. The scroll-type fluid machine as recited in claim 1, wherein said first attachment means is a push nut.

4. The scroll-type fluid machine as recited in claim 1, wherein said second attachment means is a push nut.

* * * * *